July 29, 1930. C. R. HUBBARD ET AL 1,771,890

PACKING

Filed May 28, 1928

INVENTORS:
Cecil R. Hubbard
and Robert M. Waples,
By Attorneys,
Fraser, Myers & Manley Patented July 29, 1930

1,771,890

UNITED STATES PATENT OFFICE

CECIL R. HUBBARD, OF NEWARK, AND ROBERT M. WAPLES, OF PALMYRA, NEW YORK, ASSIGNORS TO THE GARLOCK PACKING COMPANY, OF PALMYRA, NEW YORK, A CORPORATION OF NEW YORK

PACKING

Application filed May 28, 1928. Serial No. 281,138.

This invention relates to an improved machinery packing adapted for use in the packing of piston rods, plungers, rotary shafts and the like.

One object of the invention is to provide a packing the sealing effect of which will be automatically increased when subjected to the pressure of the liquid or fluid the escape of which it is its purpose to oppose.

It is another object of the invention to provide a packing which will be held in snug frictional engagement with a piston rod during the pressure stroke of the piston but which will automatically release its tension against movement of the piston on the return stroke, thereby reducing wear on both the packing and the rod.

In the drawings illustrating the preferred form of the invention,—

For purposes of illustration the invention is herein disclosed as applied to pack the joint about a reciprocating piston, although it is adapted for general application to the sealing of joints generally about rods, plungers, shafts and the like, subjected to liquid or fluid pressure.

Figure 1:
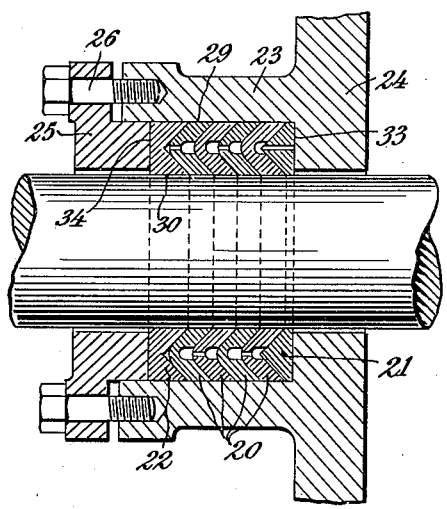
Figure 1 is a conventional view, in longitudinal section, of a piston and stuffing box, the joint about the piston being indicated as sealed by packing embodying the invention herein sought to be protected.

Referring first to Fig. 1, the packing comprises intermediate packing elements 20 and end packing elements 21, 22, mounted within a stuffing box comprising a cylindrical element 23 extended from a cylinder head 24 and closed at its end by a gland 25 secured to the element 23 by machine screws 26 or other suitable fastening means.

Figure 2:
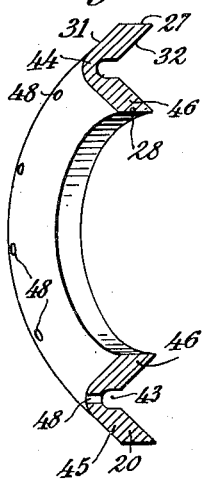
Fig. 2 is a large scale perspective view of one of the intermediate packing rings of the packing illustrated in Fig. 1, parts being shown in cross-section.

The packing illustrated generally in Fig. 1 may comprise a single intermediate ring 20 or a plurality of such rings, one of which is shown in detail in Fig. 2. Such ring comprises an annulus having concentric inner and outer circumferential surfaces 27, 28, adapted to make contact respectively with the inner surface 29 (Fig. 1) of a stuffing box and the outer surface 30 of a piston.

The surfaces 27 and 28 may be united by surfaces 31, 32, the former of which should be convex and the latter of which should be concave, as indicated in Fig. 2. These surfaces 31 and 32 should preferably comprise complementary elements so that, when two or more of the rings 20 are used in the manner indicated in Fig. 1, the surface 31 of one ring will make snug contact with the surface 32 of an adjoining ring. In the preferred form of the invention as herein disclosed, the surfaces 27 and 28 are cylindrical and the surfaces 31 and 32 comprise conical elements of corresponding inclination.

Figure 4:
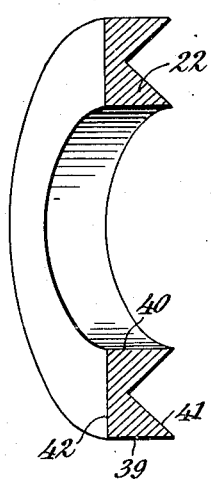
Fig. 4 is a similar view of the other end ring of the packing illustrated in Fig. 1, said ring being of a form adapted for use at the end of the stuffing box farthest from the source of pressure to be opposed.
Figure 3:
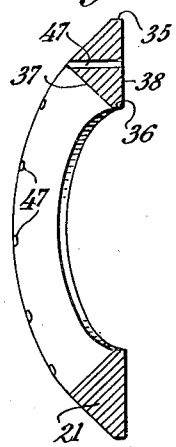
Fig. 3 is a similar view of one of the end rings of the packing illustrated in Fig. 1, this ring being of a form adapted for use at the end of the stuffing box nearest the source of pressure to be opposed.

In order that the packing may be used in a stuffing box having a plane surface 33 at one end and a gland having a plane surface 34 forming its other end, each of the end rings of the packing may, as indicated in Figs. 3 and 4, have one surface complemental to the adjacent surface of the intermediate ring and an opposite plane surface to conform with the surface of the stuffing box. The ring 21, therefore, as indicated in Fig. 3, may have outer and inner surfaces 35 and 36 connected by a concave surface 37 complemental to the surface 32 of an intermediate ring and a plane surface 38 complemental to the surface 33 at the end of the stuffing box. The ring 22 may comprise outer and inner surfaces 39, 40 connected by a concave surface 41 complemental to the surface 31 of an intermediate ring and a plane surface 42 complemental to the surface 34 of the gland.

When applying the packing to the joint to be packed, the rings should be so disposed that the concave surfaces 32, 41 are directed towards the source of pressure to be opposed, so that the liquid or fluid to be confined by the packing when forced between the surfaces of the packing rings will tend to flatten said rings and thus force the outer portions thereof into firm contact with the inner surface of the stuffing box and the inner portions into firm contact with the outer surface of the piston.

The effectiveness of the intermediate rings 20 may be enhanced if each ring is so constructed that the circumferential zone approximately midway between its outer and inner surfaces is reduced in thickness or weakened, or otherwise caused to be relatively flexible as compared with the adjoining portions of the ring, in order to unite them in a hinge-like manner. To this end, one or the other of the connecting surfaces 31, 32 of each ring may be grooved. In the preferred form of the invention herein disclosed, each intermediate ring is reduced in thickness midway between its inner and outer surfaces by grooving the concave surface 32 as at 43 (Fig. 2), thereby providing a relatively flexible hinge-like portion 44 between the outer ring element 45 and the inner ring element 46.

The automatic flattening of the packing rings when subjected to pressure is enhanced by suitably disposed ports adapted to direct the liquid or fluid to be confined to the parts of the ring surfaces best adapted to accomplish that purpose. As clearly indicated in Figs. 1, 2 and 3, such ports may be arranged in spaced relation along a circumferential zone of each ring, except the ring farthest from the source of pressure, substantially midway between its inner and outer surfaces, as indicated at 47 (Fig. 3) and at 48 (Fig. 2). Preferably, the ports should vary in number, the greater number being provided in the ring disposed nearest to the source of pressure and the minimum number being provided in a ring located farther from the source of pressure. There should, however, be no ports in the ring farthest from the source of pressure, which should be imperforate.

The ports 47, 48 permit liquid or fluid which may force its way into the joints between any two rings to pass through the ports in the ring directed away from the source of pressure and be brought in contact with the surface of the next ring best adapted to cause the outer and inner ring elements 45 and 46 to be flexed about the hinge-like connecting portion 44, so as to bring the surfaces 27 and 28 in snug contact with the surfaces of the stuffing box and piston rod respectively. Preferably, the ports of one ring should be so disposed as to be out of alignment with the ports of an adjoining ring so that fluid or liquid passing through the ports of one will be compelled to flow through the circumferential conduit between the two rings and thus be brought in contact with some considerable portion of the ring surface before it can pass through the ports of the next ring. By varying the number of ports in the successive rings and disposing the rings having the largest number of ports nearest the source of pressure, the pressure on the successive rings between their contacting surfaces is distributed instead of being permitted to become localized between any one pair of rings, so as to cause all of the rings to be flattened or increased in effective width during the pressure stroke of the cylinder, thereby distributing the sealing pressure of the packing throughout its length.

Packing of the above-described character may be made of soft metal, rubber composition, or other appropriate material adapted to be brought into a snug sealing contact with the surfaces of the piston and stuffing box and to be sufficiently flexible to be flattened or spread out in thickness when subjected to the liquid or fluid pressure to be sustained. Preferably the packing rings will be made of a combination of fibrous material and rubber composition analogous to the product known as friction fabric. If intended to be subjected to high temperature, the fibrous material may comprise asbestos fabric or some substance of similar character.

Figure 5:
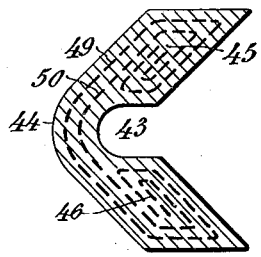
Fig. 5 is an enlarged cross-sectional view of one of the intermediate rings, indicating one manner in which fabric may be combined with rubber composition or other plastic material to construct a strong and durable packing element.

In Fig. 5 is indicated one manner in which a packing ring embodying the invention may be built up of fabric and plastic composition without making it necessary to cut the layers of fabric along the side walls of the groove 43. The two layers of fabric 49, 50 may be so folded as to have their edges embedded within the inner and outer ring elements 46, 45. The central portions of the fabric are so disposed as to be embedded in the relatively thin hinge-like portion 44 of the packing ring.

When the parts at one end of the piston rod may be readily disassembled the packing may be applied in the form of endless rings. On the other hand, if the ends of the piston rod are of greater diameter than the portion intended to receive the packing, or if the piston rod is more or less permanently connected to parts of greater diameter, the packing may be applied in the form of split rings, or in half rings, which should be inserted in the stuffing box in a broken-joint relationship in order to prevent the escape of liquid or fluid by passing from the joint of one ring to the joint of the next ring.

It will be apparent that the pressure of the confined liquid or fluid which makes its way through the ports in one ring into the slot 43 of another ring will exert pressure against the side walls of said slot such as to flex the ring elements 45, 46 about the hinge-like connecting portion 44 and force the surfaces 27, 28 of the packing ring in snug sealing contact with the surfaces of the piston and stuffing box. It will also be apparent that the liquid or fluid which passes through the ports in one ring and attempts to make its way to the surface of the packing between the the contacting surfaces of said ring and the next ring of the series is subjected to an abrupt change in its direction of flow, which would also tend to rotate the outer and inner portions of the ring about the hinge-like connecting portion 44 and thereby increase the effective distance between the surfaces 27, 28.

The increased frictional contact between the packing and the piston due to the pressure of the liquid or fluid to be confined is effective only so long as the pressure is applied, that is, during the pressure stroke of the piston. As soon as the pressure is relieved during the return stroke of the piston, the frictional tension exerted by the packing against the piston surface will be immediately relieved, thereby materially reducing the wear of the moving parts and avoiding a needless waste of energy.

The invention is not intended to be limited to the specific form herein disclosed for purposes of illustration, but should be regarded as including modifications and variations thereof within the scope of the appended claims:

What is claimed is:

1. A packing ring of a relative flat V shape in cross section, having concentric inner and outer circumferential surfaces, and a pair of connecting surfaces, one concave and the other convex, one of said connecting surfaces being grooved circumferentially approximately midway between the inner and outer surface to reduce the thickness of the ring and form a hinge-like connection between the adjoining parts of the structure, the grooved portion of said ring being perforated so as to provide a means of communication for fluid pressure from one connecting surface to the other.

2. A packing comprising a plurality of rings, each of a relatively flat V shape in cross section, having concentric inner and outer circumferential surfaces and a pair of connecting surfaces, the contacting connecting surfaces of adjacent rings comprising complementary concave and convex elements so disposed that all of the concave elements may be directed towards the source of pressure to be opposed, said packing including rings, each having one of its connecting surfaces grooved circumferentially approximately midway between its inner and outer surface to reduce its thickness and form a hinge-like connection between the adjoining parts of the structure, the grooved portions of said rings being perforated so as to provide means of communication for fluid pressure between the grooved portions of adjacent rings.

3. A packing, as defined by claim 2, including rings of which the perforations comprise ports varying in number, so that the ring having the greatest number of ports may be disposed nearest the source of pressure to be opposed and the ring having the minimum number at a distance therefrom.

In witness whereof we have hereunto signed our names.

CECIL R. $\overset{\text{his}}{\times}$ HUBBARD.

ROBERT M. $\overset{\text{mark}}{}$ WAPLES.